US012766415B2

(12) United States Patent
Zhang et al.

(10) Patent No.: US 12,766,415 B2
(45) Date of Patent: Oct. 20, 2026

(54) SMART WATCH-BASED SOMATOSENSORY GAME METHOD

(71) Applicant: Shenzhen Shimi Network Technology Co., Ltd., Shenzhen (CN)

(72) Inventors: Ke Zhang, Shenzhen (CN); Yuan Yao, Shenzhen (CN)

(73) Assignee: Shenzhen Shimi Network Technology Co., Ltd., Shenzhen (CN)

( * ) Notice: Subject to any disclaimer, the term of this patent is extended or adjusted under 35 U.S.C. 154(b) by 417 days.

(21) Appl. No.: 18/244,233

(22) Filed: Sep. 9, 2023

(65) Prior Publication Data

US 2025/0018297 A1 Jan. 16, 2025

(30) Foreign Application Priority Data

Jul. 13, 2023 (CN) ......................... 202310864828.0

(51) Int. Cl.

*A63F 13/65* (2014.01)
*A63F 13/211* (2014.01)
*A63F 13/212* (2014.01)
*A63F 13/48* (2014.01)
*A63F 13/67* (2014.01)

(52) U.S. Cl.

CPC ............ *A63F 13/65* (2014.09); *A63F 13/211* (2014.09); *A63F 13/212* (2014.09); *A63F 13/48* (2014.09); *A63F 13/67* (2014.09)

(58) Field of Classification Search

CPC ...... A63F 13/65; A63F 13/211; A63F 13/212; A63F 13/48; A63F 13/67

See application file for complete search history.

(56) References Cited

U.S. PATENT DOCUMENTS

| | | | | |
|---|---|---|---|---|
| 7,774,155 | B2 * | 8/2010 | Sato | A63F 13/428 345/169 |
| 8,016,672 | B2 * | 9/2011 | Suzuki | A63F 13/5378 463/31 |
| 9,050,538 | B2 * | 6/2015 | Sugiyama | A63F 13/577 |
| 12,105,519 | B2 * | 10/2024 | Kim | G05D 1/027 |
| 2014/0306821 | A1 * | 10/2014 | Rahman | A61B 5/11 340/539.11 |
| 2016/0370767 | A1 * | 12/2016 | Huang | G04B 47/06 |
| 2018/0280791 | A1 * | 10/2018 | Eno | G07F 17/326 |
| 2020/0125105 | A1 * | 4/2020 | Xiao | A47L 11/24 |
| 2024/0001220 | A1 * | 1/2024 | Jiang | A63F 13/537 |
| 2024/0020917 | A1 * | 1/2024 | Ni | G06F 9/451 |
| 2024/0136705 | A1 * | 4/2024 | He | H01Q 1/44 |

* cited by examiner

*Primary Examiner* — Xuan M Thai
*Assistant Examiner* — Shauna-Kay Hall
(74) *Attorney, Agent, or Firm* — IPro, PLLC

(57) ABSTRACT

A somatosensory game method includes: when a terminal starts a somatosensory game application, sending wake-up information to a smart watch to wake up a watch application installed in the smart watch so that the smart watch can collect a user's somatosensory data; when a somatosensory game in the somatosensory game application is started, obtaining the somatosensory data from the smart watch; constructing a virtual controller at the terminal, and importing the somatosensory data into the virtual controller to generate the user's motion trajectory data; and sending the motion trajectory data to the somatosensory game application to generate a game operation instruction.

9 Claims, 3 Drawing Sheets

SMART WATCH-BASED SOMATOSENSORY GAME METHOD

TECHNICAL FIELD

The present invention relates to the technical field of somatosensory games, and in particular to a smart watch-based somatosensory game method, apparatus and device, and a computer-readable storage medium.

BACKGROUND

Somatosensory games have become a hot trend in the game market. By capturing a user's real motion and converting it into a virtual operation in a game, it enhances the interactivity and entertainment of the game. There are currently various somatosensory game devices based on somatosensory controllers on the market, but these devices usually require additional hardware support and are not convenient to use. Therefore, there is a need to provide a somatosensory game method based on a portable device to provide a more convenient somatosensory game experience.

SUMMARY

Embodiments of the present application provide a smart watch-based somatosensory game method, which is intended to capture a user's somatosensory data by a smart watch and convert them into game operation instructions, thereby realizing a portable somatosensory game experience.

To achieve the above objective, the embodiments of the present application provide a smart watch-based somatosensory game method, comprising:

- when a terminal starts a somatosensory game application, sending wake-up information to a smart watch, wherein the wake-up information is used to wake up a watch application bound to a somatosensory game installed in the smart watch so that the smart watch can collect a user's somatosensory data;
- when a somatosensory game in the somatosensory game application is started, obtaining the somatosensory data from the smart watch;
- constructing a virtual controller at the terminal, and importing the somatosensory data into the virtual controller to generate the user's motion trajectory data; and
- transmitting and sending the motion trajectory data to the somatosensory game application to generate a game operation instruction.

In an embodiment, constructing the virtual controller at the terminal, and importing the somatosensory data into the virtual controller to generate the user's motion trajectory data comprise:

- generating a grid map consisting of a plurality of grid cells and a virtual rigid body at the terminal;
- initializing a position of the virtual rigid body in the grid map;
- updating the position of the virtual rigid body in the grid map according to the somatosensory data; and
- recording coordinate data of grid cells in the grid map that the virtual rigid body passes through during movement as the motion trajectory data.

In an embodiment, updating the position of the virtual rigid body in the grid map according to the somatosensory data comprises:

- calculating a displacement vector of the smart watch at each sampling time interval according to the somatosensory data;
- determining a displacement direction and a displacement distance of the virtual rigid body in the grid map according to the displacement vector;
- comparing the displacement distance with a length of the grid cell in the displacement direction; and
- if the displacement distance is greater than the length of the grid cell in the displacement direction, updating the position of the virtual rigid body in the grid map according to the displacement vector.

In an embodiment, updating the position of the virtual rigid body in the grid map according to the displacement vector comprises:

- performing collision detection according to the shape and size of the virtual rigid body and the displacement vector; and
- if the position of the virtual rigid body exceeds any boundary of the grid map according to a result of the collision detection, then moving the virtual rigid body to a grid cell closest to the boundary in the grid map according to the displacement vector.

In an embodiment, generating the grid map consisting of the plurality of grid cells comprises:

- determining the size and number of grid cells in the grid map according to an attribute of the somatosensory game, wherein the attribute of the somatosensory game comprises a game type, game difficulty, and a game scene.

In an embodiment, transmitting and sending the motion trajectory data to the somatosensory game application to generate the game operation instruction comprise:

- judging, according to the motion trajectory data, whether the user has completed a required somatosensory action; and
- if so, generating a matching game instruction.

In an embodiment, judging, according to the motion trajectory data, whether the user has completed the required somatosensory action, comprises:

- fitting according to the motion trajectory data to obtain a motion trajectory function;
- calculating a similarity between the motion trajectory function and a preset action function; and
- if the similarity is greater than a set threshold, judging that the user has completed the required somatosensory action.

To achieve the above objective, the embodiments of the present application further provide a smart watch-based somatosensory game apparatus, comprising:

- a wake-up module configured to, when a terminal starts a somatosensory game application, send wake-up information to a smart watch, wherein the wake-up information is used to wake up a watch application bound to a somatosensory game installed in the smart watch so that the smart watch can collect a user's somatosensory data;
- an acquisition module configured to, when a somatosensory game in the somatosensory game application is started, obtain the somatosensory data from the smart watch;
- a construction module configured to construct a virtual controller at the terminal and import the somatosensory data into the virtual controller to generate the user's motion trajectory data; and an instruction generating module configured to transmit and send the motion trajectory data to the somatosensory game application to generate a game operation instruction.

To achieve the above objective, the embodiments of the present application further propose a smart watch-based somatosensory game device, comprising a memory, a processor and a smart watch-based somatosensory game program stored on the memory and executable on the processor, wherein when the processor executes the smart watch-based somatosensory game program, any one of the smart watch-based somatosensory game methods as described above is implemented.

To achieve the above objective, the embodiments of the present application further propose a computer-readable storage medium, having a smart watch-based somatosensory game program stored thereon, wherein when the smart watch-based somatosensory game program is executed by a processor, any one of the smart watch-based somatosensory game methods as described above is implemented.

In the smart watch-based somatosensory game method of the technical solution of the present application, when the somatosensory game application is started, the wake-up information can be sent to the smart watch to wake up the watch application to collect the user's somatosensory data. Then, the somatosensory data is obtained from the smart watch, a virtual controller is constructed on the terminal, and the somatosensory data is imported into the virtual controller to generate the user's motion trajectory data. Finally, the motion trajectory data is transmitted and sent to the somatosensory game application to generate the game operation instruction. Compared with somatosensory games that use game controllers as instruction input, the somatosensory game method of the technical solution of the present application has the advantages of no need for additional devices, higher degree of freedom, stronger mobility, higher data accuracy, tighter system integration, etc. These advantages enable the smart watch-based somatosensory game method to provide a more convenient, immersive and real somatosensory game experience, and bring a higher-quality entertainment and interactive experience to users.

BRIEF DESCRIPTION OF FIGURES

In order to more clearly illustrate the technical solutions in embodiments of the present invention or the prior art, the drawings needed to be used in the description of the embodiments or the prior art will be briefly described below. Obviously, the drawings in the following description are only some embodiments of the present invention, and other drawings can also be obtained by those of ordinary skill in the art from the structures illustrated in these drawings without any creative efforts.

Figure 1:
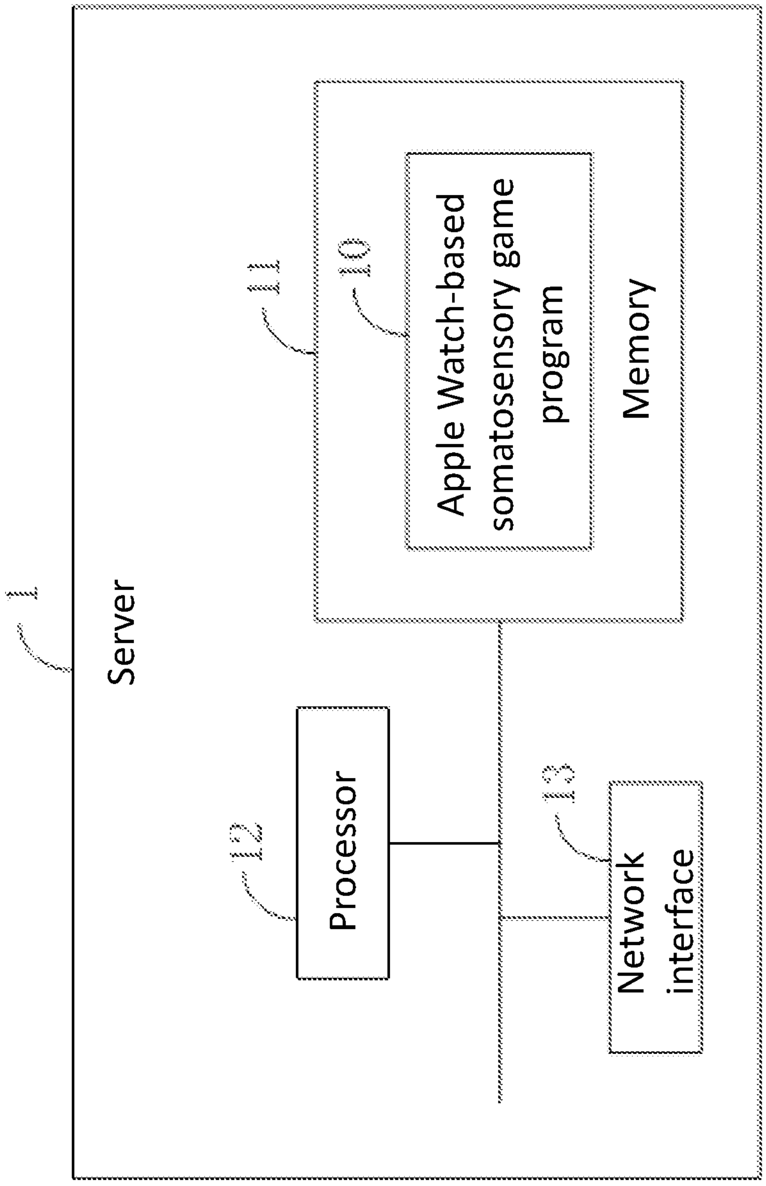
FIG. 1 is a module structural diagram of a smart watch-based somatosensory game device according to an embodiment of the present invention.

The implementation, functional features and advantages of the objective of the present invention will be further described with reference to the drawings.

DETAILED DESCRIPTION

It should be understood that specific embodiments described herein are only used to explain the present invention and are not used to limit the present invention.

In order to better understand the above technical solutions, exemplary embodiments of the present disclosure will be described in more detail below with reference to the drawings. While the exemplary embodiments of the present disclosure have been shown in the drawings, it should be understood that the present disclosure may be implemented in various forms and should not be limited by the embodiments set forth herein. Rather, these embodiments are provided so that the present disclosure can be understood more thoroughly, and the scope of the present disclosure can be fully conveyed to those skilled in the art.

It should be noted that, in the claims, any reference signs placed between parentheses shall not be construed as limiting the claims. The words "comprising" or "comprises" herein do not exclude the presence of components or steps not listed in the claims. The indefinite article "a" or "an" preceding a component does not exclude the presence of a plurality of such components. The present invention can be implemented by means of hardware including several different components, and a suitably programmed computer. In a unit claim enumerating several means, several of these means can be embodied by the same item of hardware. Moreover, the use of "first," "second," and "third," etc. does not imply any order, and these words may be construed as designations.

As shown in FIG. 1, FIG. 1 is a schematic structural diagram of a server 1 (also called a smart watch-based somatosensory game device) in a hardware running environment involved in a solution of an embodiment of the present invention.

The server of the embodiment of the present invention is, for example, an "Internet of Things device", a smart air conditioner with a networking function, a smart light, a smart power supply, an AR/VR device with a networking function, a smart speaker, a self-driving car, a PC, a smart phone, a tablet computer, an e-book reader, a portable computer, or other devices with display functions.

As shown in FIG. 1, the server 1 includes a memory 11, a processor 12 and a network interface 13.

The memory 11 includes at least one type of readable storage medium, and the readable storage medium includes a flash memory, a hard disk, a multimedia card, a card-type memory (e.g., an SD or DX memory, etc.), a magnetic memory, a magnetic disk, an optical disk or the like. In some embodiments, the memory 11 may be an internal storage unit of the server 1, such as a hard disk of the server 1. In other embodiments, the memory 11 may also be an external storage device of the server 1, such as a plug-in hard disk equipped on the server 1, a smart media card (SMC), a secure digital (SD) card, a flash card or the like.

Further, the memory 11 may also include an internal storage unit of the server 1 and an external storage device. The memory 11 can not only be used to store application software and various data installed on the server 1, such as codes of a smart watch-based somatosensory game program 10, etc., but also can be used to temporarily store data that has been output or will be output.

In some embodiments, the processor 12 may be a central processing unit (CPU), a controller, a microcontroller, a microprocessor or other data processing chips, and used to run program codes or processing data stored in the memory 11, such as the Apple Watch-based somatosensory game program 10, etc.

The network interface 13 may optionally include a standard wired interface and a wireless interface (such as a WI-FI interface), and is generally used to establish communication connections between the server 1 and other electronic devices.

The network may be the Internet, a cloud network, a wireless fidelity (Wi-Fi) network, a personal network (PAN), a local area network (LAN) and/or a metropolitan area network (MAN). Various devices in a network environment may be configured to connect to a communication network according to various wired and wireless communication protocols. Examples of such wired and wireless communication protocols may include, but are not limited to, at least one of the following: Transmission Control Protocol and Internet Protocol (TCP/IP), User Datagram Protocol (UDP), Hypertext Transfer Protocol (HTTP), file transfer Protocol (FTP), ZigBee, EDGE, IEEE 802.11, Optical Fidelity (Li-Fi), 802.16, IEEE 802.11s, IEEE 802.11g, multi-hop communication, wireless access point (AP), device-to-device communication, cellular communication protocol and/or Bluetooth (Blue Tooth) communication protocol, or a combination thereof.

Optionally, the server may further comprise a user interface. The user interface may include a display and an input unit such as a keyboard. Optional user interfaces may also include standard wired interfaces and wireless interfaces. Optionally, in some embodiments, the display may be an LED display, a liquid crystal display, a touch-sensitive liquid crystal display, an organic light-emitting diode (OLED) touch device, or the like. The display may also be referred to as a display screen or a display unit, and is used to display information processed in the server 1 and to display a visualized user interface.

FIG. 1 only shows the server 1 with components 11-13 and the smart watch-based somatosensory game program 10. It can be understood by those skilled in the art that the structure shown in FIG. 1 does not form a limitation of the server 1, and may include fewer or more components than shown, or combinations of certain components, or different arrangements of components.

In this embodiment, the processor 12 may be used to call the smart watch-based somatosensory game program stored in the memory 11, and perform the following operations:

when a terminal starts a somatosensory game application, sending wake-up information to a smart watch, wherein the wake-up information is used to wake up a watch application bound to a somatosensory game installed in the smart watch so that the smart watch can collect a user's somatosensory data;

when a somatosensory game in the somatosensory game application is started, obtaining the somatosensory data from the smart watch;

constructing a virtual controller at the terminal, and importing the somatosensory data into the virtual controller to generate the user's motion trajectory data; and transmitting and sending the motion trajectory data to the somatosensory game application to generate a game operation instruction.

In an embodiment, the processor 12 may be used to call the smart watch-based somatosensory game program stored in the memory 11, and perform the following operations:

generating a grid map consisting of a plurality of grid cells and a virtual rigid body at the terminal;

initializing a position of the virtual rigid body in the grid map;

updating the position of the virtual rigid body in the grid map according to the somatosensory data; and recording coordinate data of grid cells in the grid map that the virtual rigid body passes through during movement as the motion trajectory data.

In an embodiment, the processor 12 may be used to call the smart watch-based somatosensory game program stored in the memory 11, and perform the following operations:

calculating a displacement vector of the smart watch at each sampling time interval according to the somatosensory data;

determining a displacement direction and a displacement distance of the virtual rigid body in the grid map according to the displacement vector;

comparing the displacement distance with a length of the grid cell in the displacement direction; and if the displacement distance is greater than the length of the grid cell in the displacement direction, updating the position of the virtual rigid body in the grid map according to the displacement vector.

In an embodiment, the processor 12 may be used to call the smart watch-based somatosensory game program stored in the memory 11, and perform the following operations:

performing collision detection according to the shape and size of the virtual rigid body and the displacement vector; and if the position of the virtual rigid body exceeds any boundary of the grid map according to a result of the collision detection, then moving the virtual rigid body to a grid cell closest to the boundary in the grid map according to the displacement vector.

In an embodiment, the processor 12 may be used to call the smart watch-based somatosensory game program stored in the memory 11, and perform the following operations:

determining the size and number of grid cells in the grid map according to an attribute of the somatosensory game, wherein the attribute of the somatosensory game comprises a game type, game difficulty, and a game scene.

In an embodiment, the processor 12 may be used to call the smart watch-based somatosensory game program stored in the memory 11, and perform the following operations:

judging, according to the motion trajectory data, whether the user has completed a required somatosensory action; and if so, generating a matching game instruction.

In an embodiment, the processor 12 may be used to call the smart watch-based somatosensory game program stored in the memory 11, and perform the following operations:

obtaining a motion trajectory function by fitting according to the motion trajectory data;

calculating a similarity between the motion trajectory function and a preset action function; and if the similarity is greater than a set threshold, judging that the user has completed the somatosensory action meeting the requirement.

Based on the hardware architecture of the smart watch-based somatosensory game device described above, an embodiment of a smart watch-based somatosensory game method is proposed. The smart watch-based somatosensory game method of the present invention is intended to capture the user's somatosensory data by the smart watch and convert them into game operation instructions, thereby realizing a portable somatosensory game experience.

Figure 2:
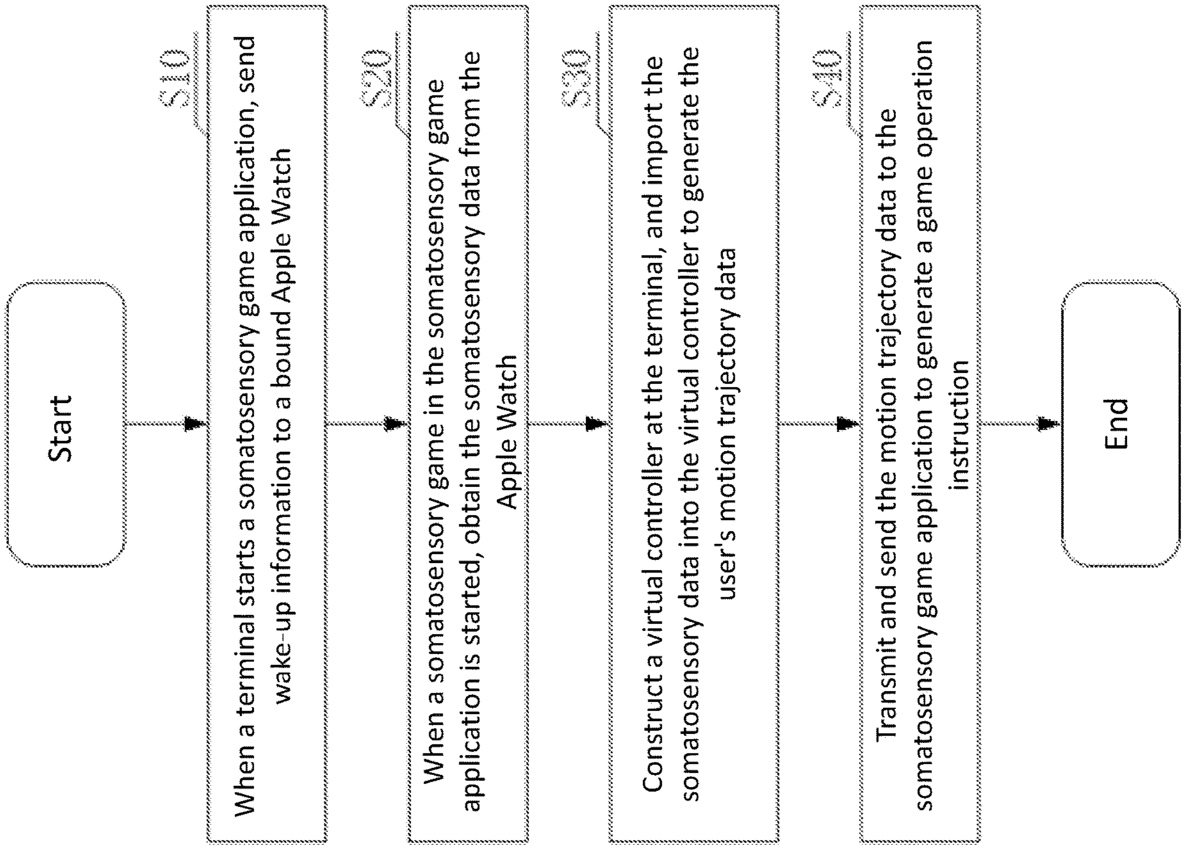
FIG. 2 is a schematic flowchart of a smart watch-based somatosensory game method according to an embodiment of the present invention.
Figure 3:
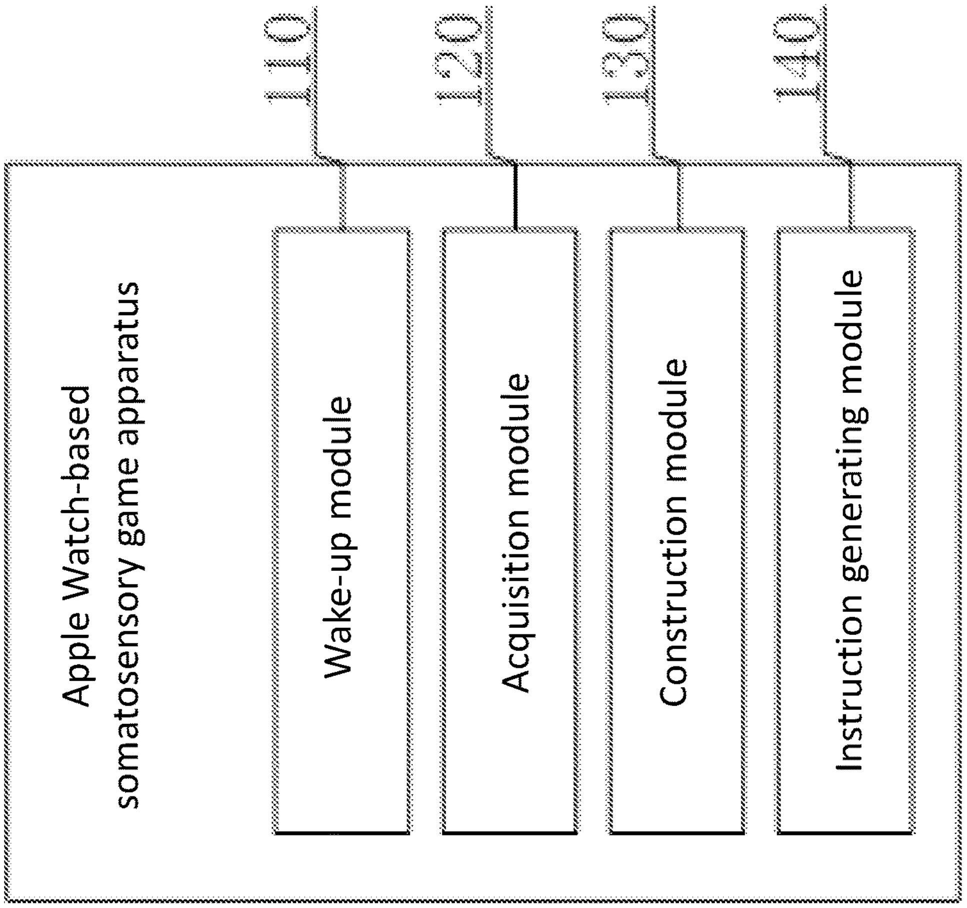
FIG. 3 is a module structural diagram of a smart watch-based somatosensory game apparatus according to an embodiment of the present invention.

Referring to FIG. 2, FIG. 2 shows a smart watch-based somatosensory game method according to an embodiment of the present invention. The smart watch-based somatosensory game method includes the following steps:

S10: When a terminal starts a somatosensory game application, send wake-up information to a smart watch, wherein the wake-up information is used to wake up a watch application bound to a somatosensory game installed in the smart watch so that the smart watch can collect a user's somatosensory data.

Here, the terminal refers to a smart device that can be bound with the smart watch, such as an Apple mobile phone, an Apple computer, an Apple tablet, etc. It is worth noting that the communication link between the smart watch and the terminal is usually established based on the Bluetooth protocol.

The experience game application refers to a somatosensory game application program installed in the above device, which will act as a bridge to communicate with the smart watch, so as to control the game operation and receive data from a sensor of the smart watch.

Specifically, when a user starts the somatosensory game application on the terminal device, the terminal device will send a wake-up message to the smart watch. The wake-up information may be transmitted using the Bluetooth communication protocol, and commands or identifiers are usually sent through the Bluetooth connection between the devices. After the smart watch receives the wake-up information from the terminal device, the somatosensory game application installed on the watch will be woken up and started. This means that the watch application program is ready to start receiving data from the watch sensor and transmitting it back to the somatosensory game application on the terminal device. In addition, the application on the smart watch may also be used to record the user's exercise data, such as heart rate data, calorie consumption and other data, to record the user's exercise performance when playing the somatosensory game.

This setting can enable the smart watch to automatically enter the game state in cooperation with the somatosensory game, so as to improve the user experience.

S20: When a somatosensory game in the somatosensory game application is started, obtain the somatosensory data from the smart watch.

Here, the somatosensory game application runs on the terminal device as a software application, and it communicates with the smart watch to receive the somatosensory data obtained from the watch sensor. Then, the somatosensory game application processes and analyzes the data, and converts the data into game operation instructions, which are used to drive the somatosensory game. Therefore, the somatosensory game application provides a platform for users to interact with the somatosensory game, and realizes the connection between the user's actual actions and the game world through the somatosensory data acquisition function of the smart watch.

The somatosensory data includes but is not limited to acceleration data, gyroscope data, heart rate data, etc. The somatosensory data can be collected through sensors on the smart watch, such as accelerometers, gyroscopes, and heart rate sensors.

Specifically, after the somatosensory game is started, the somatosensory game application sends a data request to the smart watch application, indicating that it needs to obtain somatosensory data. After receiving the data request from the somatosensory game application, the smart watch application starts to collect somatosensory data from sensors (such as an accelerometer, a gyroscope, etc.) on the watch. The watch application transmits the collected somatosensory data back to the somatosensory game application on the terminal device.

Further, after receiving the somatosensory data from the smart watch, the somatosensory game application analyzes and processes it. The data can include information such as the user's wrist actions, body posture, heart rate, etc., depending on the sensors available on the watch.

S30: Construct a virtual controller at the terminal, and import the somatosensory data into the virtual controller to generate the user's motion trajectory data.

Here, the virtual controller generally refers to a simulated game controller implemented in the form of software on a terminal device. It provides a virtual interface that allows users to simulate the operations of traditional game controllers through device functions such as touch screens, gyroscopes, and accelerometers.

However, the virtual controller in the technical solution of the present application is used for preprocessing the somatosensory data. The purpose of preprocessing the somatosensory data is to filter out some unnecessary or invalid data, so as to extract valid data that truly represents the user's actual actions, i.e., motion trajectory data.

The virtual controller preprocesses the somatosensory data by judging the speed data generated by small-scale movement as "no real motion", and further eliminating the somatosensory data judged as "no real motion".

The motion trajectory data refers to data that records the user's motion path and trajectory in the somatosensory game. It describes information such as the user's actual motion, position changes, and gesture actions during the game. The motion trajectory data can be used to generate character motion and actions, control scene changes in the game, trigger specific game events or feedback, etc.

Specifically, the somatosensory game application imports the somatosensory data obtained from the smart watch into the virtual controller. By importing somatosensory data into the virtual controller, the virtual controller can generate the user's motion trajectory data. The motion trajectory data accurately describes the user's actions and postures in the somatosensory game, such as the path of the user's movement in the virtual space, the trajectory of rotation or jumping, etc.

It can be understood that through the preprocessing and screening process of the virtual controller, some noise data or invalid data can be removed, and only the somatosensory data that truly represents the user's actual actions are retained. This can improve the accuracy and responsiveness of the somatosensory game, making the game closer to the user's real actions and experience.

S40: Transmit and send the motion trajectory data to the somatosensory game application to generate a game operation instruction.

Specifically, after receiving the motion trajectory data, the somatosensory game application performs data analysis and processing. The data may include information such as the user's motion path, speed, and direction. According to the analyzed motion trajectory data, the somatosensory game application generates corresponding game operation instructions. These instructions may be used to drive the characters in the game to move, attack, jump and other operations, so that the user controls the interaction of the game through somatosensory actions.

Based on steps S10 to S40 described above, it can be seen that the smart watch-based somatosensory game method of the technical solution of the present application has the following advantages over somatosensory games using game controllers as instruction input:

1. No need for additional devices: Traditional somatosensory games usually require a dedicated game controller or device to capture the user's somatosensory actions. However, the technical solution of the present application uses the smart watch as a somatosensory data acquisition device without the need for an additional game controller. This reduces the user's device requirements and costs, making somatosensory games more convenient and popular.

2. Higher degree of freedom: The smart watch is used as the input device of somatosensory games, and the user can operate the games through wrist actions and body postures. Wrist movements and body posture provide more freedom and immersion than traditional game controllers, so that the user can participate in games more naturally and move and interact in a wider range of spaces.

3. Stronger mobility: Due to the portability of the smart watch, the user can play somatosensory games anytime and anywhere without being limited to a fixed game controller or game venue. This mobility advantage provides the user with more flexibility and convenience, enabling somatosensory games to be enjoyed in various scenes.

4. Higher data accuracy: Invalid data in the somatosensory data is screened out by the virtual controller, and the motion trajectory data that can more accurately feedback the user's real action is sent to the somatosensory game application to generate game operation instructions. In this way, the somatosensory game can more accurately reflect the user's actions and gestures, providing a more realistic gaming experience.

5. Tighter system integration: The tight integration between the smart watch and terminal devices (such as an iPhone) enables efficient communication and data exchange between somatosensory game applications and watch applications. This tightly integrated advantage provides faster and more stable data transmission and game instruction response, improving the performance and user experience of somatosensory games.

In some embodiments, constructing the virtual controller at the terminal, and importing the somatosensory data into the virtual controller to generate the user's motion trajectory data include:

S31: Generate a grid map consisting of a plurality of grid cells and a virtual rigid body at the terminal.

Here, the grid map is a data structure that can divide the user's motion space into a plurality of areas with the same or different sizes and shapes, and can record whether there is an object in each area. The virtual rigid body is a model that can move in the grid map according to the user's somatosensory data and have physical effects such as collision and rebound with other objects.

S32: Initialize a position of the virtual rigid body in the grid map.

Specifically, the virtual controller may be used to set the initial position of the virtual rigid body at a specific position on the grid map, so that the user has an initial starting position in the game.

S33: Update the position of the virtual rigid body in the grid map according to the somatosensory data.

Specifically, the somatosensory data may be converted into coordinate values of the grid map by means of motion equations, integration methods (such as the Euler method or the Runge-Kutta method), and then the position of the virtual rigid body in the grid map may be updated.

S34: Record coordinate data of grid cells in the grid map that the virtual rigid body passes through during movement as the motion trajectory data.

Specifically, a data structure may be created to store the coordinate data of the grid cells that the virtual rigid body passes through, and data structures such as arrays, lists, and matrices may be used to represent trajectory data. During the game, coordinate values of the grid cells where the virtual rigid body is located may be recorded in the trajectory data structure according to a time sequence, as the trajectory data of the somatosensory device in space.

It can be understood that the above solution can convert a continuous coordinate sequence into a discrete grid cell sequence by expressing the motion trajectory data of the somatosensory device as processed grid coordinates. In this way, the small changes between adjacent coordinates in the middle are removed to eliminate redundant data/noise generated by non-real actions in the somatosensory data, thereby optimizing the accuracy and storage of data, so that the calculation efficiency of motion trajectories can be improved.

In some embodiments, updating the position of the virtual rigid body in the grid map according to the somatosensory data includes:

S110: Calculate a displacement vector of the smart watch at each sampling time interval according to the somatosensory data.

Here, the sampling time interval refers to a time interval between adjacent data samples in the somatosensory data processing. It determines the frequency and time interval selected to sample the somatosensory data in the continuous time sequence.

The displacement vector is used to represent a displacement change caused by the user's motion or wrist action. It is a mathematical description of the linear distance and direction from an initial position to a final position.

Specifically, the somatosensory data obtained from the sensors of the smart watch includes accelerometer and gyroscope data. After obtaining the somatosensory data, the terminal may integrate the accelerometer data to obtain a velocity value, and then integrate the velocity value to obtain a displacement value.

S120: Determine a displacement direction and a displacement distance of the virtual rigid body in the grid map according to the displacement vector.

Specifically, the direction and magnitude of the displacement vector may be used to determine the moving direction and distance of the virtual rigid body corresponding to the user's wrist action or body posture.

S130: Compare the displacement distance with a length of the grid cell in the displacement direction.

Specifically, when the displacement distance is compared with the length of the grid cell in the displacement direction, the following steps may be implemented:

1. Determine the displacement direction: Determine the displacement direction of the virtual rigid body according to the calculation result of the displacement vector. The displacement direction may be determined by the direction of the displacement vector.

2. Obtain the length of the grid cell: According to the design and setting of the grid map, obtain the length of the grid cell in the displacement direction.

3. Compare the displacement distance with the grid cell length: Compare the calculated displacement distance with the length of the grid cell in the displacement direction.

S140: If the displacement distance is greater than the length of the grid cell in the displacement direction, update the position of the virtual rigid body in the grid map according to the displacement vector.

Specifically, according to the comparison result in step S130, if the displacement distance is greater than the length of the grid cell, it means that the virtual rigid body has moved a long enough distance and can move to an adjacent grid cell. On the contrary, if the displacement distance is less than or equal to the length of the grid cell, it means that the virtual rigid body has not moved enough and remains in the current grid cell.

It can be understood that by comparing the displacement distance with the length of the grid cell, it may be judged whether the virtual rigid body needs to move to an adjacent grid cell. If the displacement distance exceeds the length of the grid cell, then the position of the virtual rigid body in the grid map will be updated to reflect its state of moving to the adjacent grid cell.

In this way, the virtual rigid body can accurately move in the grid map according to the displacement data, and realize the precise correspondence with the somatosensory data. Furthermore, the user's somatosensory actions can be accurately mapped to the movement trajectory in the virtual environment, providing more accurate motion data and trajectory information for somatosensory games.

In some embodiments, updating the position of the virtual rigid body in the grid map according to the displacement vector includes:

S210: Perform collision detection according to the shape and size of the virtual rigid body and the displacement vector.

Specifically, after the position of the virtual rigid body is updated, a collision detection algorithm may be executed according to the shape, size and displacement vector of the virtual rigid body. This may be done by performing collision detection with obstacles or boundaries in the grid map, and judging whether the virtual rigid body intersects or approaches them.

S220: If the position of the virtual rigid body exceeds any boundary of the grid map according to the result of the collision detection, then move the virtual rigid body to a grid cell closest to the boundary in the grid map according to the displacement vector.

Specifically, if the result of the collision detection shows that the position of the virtual rigid body exceeds any boundary of the grid map, the virtual rigid body is moved to the grid cell closest to the boundary according to the displacement vector. This may be done by adjusting the position of the virtual rigid body to the closest legal position of the boundary.

Through the above steps, the position of the virtual rigid body may be adjusted according to the results of collision detection and boundary detection to ensure that it remains within the effective range of the grid map after displacement. This may prevent the virtual rigid body from crossing obstacles and ensure the legitimacy of its movement trajectory in the game environment. This helps to provide a more realistic and accurate somatosensory gaming experience, and ensures the legality and accuracy of game operations.

In some embodiments, generating the grid map consisting of the plurality of grid cells includes:

determining the size and number of grid cells in the grid map according to an attribute of the somatosensory game, wherein the attribute of the somatosensory game comprises a game type, game difficulty, and a game scene.

For example, in a specific application, the overall style and layout of the grid map may be determined according to the type of somatosensory game, such as platform jumping, shooting, adventure, etc.

According to the game scene, such as forest, city, space, etc., aspects such as the background, texture, and color of the grid map may be adjusted.

According to the game type and scene, the shape of the grid cell is determined. The shape such as square, regular hexagon, square and circle may be selected to adapt to game needs and aesthetics.

According to the difficulty and goals of the game, the number and distribution of grid cells in the grid map are determined. Lower game difficulties may require fewer grid cells, while higher game difficulties may require more grid cells.

According to the requirements of the game goal, such as reaching a destination, collecting items, etc., the corresponding target position and obstacles may be set in the grid map.

It can be understood that by determining the size, quantity, shape and color of the grid cells in the grid map according to the attributes of the somatosensory game, a game environment that meets the game requirements may be provided. In this way, the user can play the somatosensory game on the grid map adapted to the game type, scene and difficulty, and complete the game goal therein. According to the design of specific game attributes, the grid map may provide a richer and more attractive game experience for somatosensory games.

It should be noted that the design of the present application is not limited thereto, and in other embodiments, the grid cell size of the grid map is set to a uniform size.

In some embodiments, transmitting and sending the motion trajectory data to the somatosensory game application to generate the game operation instruction includes:

S310: Judge, according to the motion trajectory data, whether the user has completed a required somatosensory action.

Here, the required somatosensory action is one or more motion modes preset or customized according to the attributes of the somatosensory game, including jumping, squatting, moving left and right, moving forward and backward, rotating, waving, etc.

Specifically, the recorded motion trajectory data is obtained from the virtual controller or a related device. The data may represent the movement path and trajectory of the user in the virtual environment. According to the motion trajectory data, it is judged by an algorithm or rule whether the user has completed the required somatosensory action. This may be judged based on the shape, direction, time, etc. of the motion trajectory.

S320: If so, generate a matching game instruction.

Here, the matching game instruction is one or more game operations preset or customized according to the attributes of the somatosensory game, including jumping, dodging, moving, turning, attacking, defending, etc.

Specifically, if it is judged that the user has completed the required somatosensory action, matching game operation instructions are generated according to specific game rules and requirements. These instructions may include actions such as character movement, attacking, and jumping, as well as game events and feedback that match the somatosensory actions.

Through the above solution, it may be judged according to the motion trajectory data whether the user has completed the required somatosensory action, and one or more matching game instructions may be preset or customized according to the attributes of the somatosensory game. In this way, more specific, accurate and rich game operations may be provided, so that the user's somatosensory actions can be directly mapped to the operations in the game, thereby improving the immersion and playability of the game.

In some embodiments, judging, according to the motion trajectory data, whether the user has completed the required somatosensory action includes:

S410: Obtain a motion trajectory function by fitting according to the motion trajectory data.

Specifically, the motion trajectory data may be substituted into a preset action function (such as linear function, trinomial function, trigonometric function, etc.) for fitting, and parameters of the action function may be calculated to obtain the motion trajectory function representing the user's current action.

S420: Calculate a similarity between the motion trajectory function and the preset action function.

Here, the preset action function is one or more mathematical expressions capable of representing the required somatosensory action, which are preset or customized according to the attributes of the somatosensory game.

The similarity may be represented by the distance value between two functions calculated according to the Euclidean distance formula. The smaller the Euclidean distance value between two functions, the higher the similarity between the two functions.

S430: If the similarity is greater than a set threshold, judge that the user has completed the required somatosensory action.

Specifically, according to the set threshold, if the similarity between the motion trajectory function and the preset action function exceeds the threshold, it may be judged that the user has completed the preset somatosensory action.

Through the above steps, the motion trajectory data may be used for fitting, and the similarity between the fitting function and the preset action function may be calculated. If the similarity exceeds the set threshold, it may be judged that the user has successfully completed the required somatosensory action.

It can be understood that this method based on motion trajectory function fitting and similarity calculation can improve the accuracy and sensitivity of the user's somatosensory motion. By comparing with the preset action function, it may be more accurately judged whether the user's action meets the requirements, so as to generate corresponding game instructions and feedback. This method enables somatosensory games to more accurately capture and identify the user's somatosensory actions, thereby providing a more realistic and accurate gaming experience.

In addition, referring to FIG. 6, a smart watch-based somatosensory game apparatus is further proposed in the embodiments of the present invention. The smart watch-based somatosensory game apparatus includes:

- a wake-up module 110 configured to, when a terminal starts a somatosensory game application, send wake-up information to a smart watch, wherein the wake-up information is used to wake up a watch application bound to a somatosensory game installed in the smart watch so that the smart watch can collect a user's somatosensory data;
- an acquisition module 120 configured to, when a somatosensory game in the somatosensory game application is started, obtain the somatosensory data from the smart watch;
- a construction module 130 configured to construct a virtual controller at the terminal and import the somatosensory data into the virtual controller to generate the user's motion trajectory data; and
- an instruction generating module 140 configured to transmit and send the motion trajectory data to the somatosensory game application to generate a game operation instruction.

For the steps implemented by functional modules of the smart watch-based somatosensory game apparatus, reference may be made to the various embodiments of the smart watch-based somatosensory game method of the present invention, and they will not be repeated here.

In addition, an embodiment of the present invention also proposes a computer-readable storage medium, which may be any one of or any combination of a hard disk, a multimedia card, an SD card, a flash memory card, an SMC, a read-only memory (ROM), an erasable programmable read-only memory (EPROM), a portable compact disk read-only memory (CD-ROM), a USB memory, etc. The computer-readable storage medium comprises the smart watch-based somatosensory game program. Specific implementations of the computer-readable storage medium of the present invention are substantially the same as those of the smart watch-based somatosensory game method and the server 1 described above, and they will not be repeated here.

It should be understood by those skilled in the art that the embodiments of the present invention may be provided as methods, systems, or computer program products. Therefore, the present invention can take the form of an entirely hardware embodiment, an entirely software embodiment, or an embodiment combining software and hardware aspects. Furthermore, the present invention may take the form of a computer program product embodied on one or more computer-usable storage media (including but not limited to disk storage, CD-ROM, optical storage, etc.) having computer-usable program code embodied therein.

The present invention is described with reference to flowcharts and/or block diagrams of methods, devices (systems), and computer program products according to embodiments of the invention. It should be understood that each procedure and/or block in the flowcharts and/or block diagrams, and combinations of procedures and/or blocks in the flowcharts and/or block diagrams can be implemented by computer program instructions. These computer program instructions may be supplied to a general purpose computer, a special purpose computer, an embedded processor, or a processor of other programmable data processing equipment to produce a machine, so that the instructions executed by the computer or the processor of other programmable data processing equipment produce means for implementing the function(s) specified in one or more steps of the flowcharts and/or one or more blocks of the block diagrams.

These computer program instructions may also be stored in a computer-readable memory capable of directing a computer or other programmable data processing equipment to operate in a specific manner, so that the instructions stored in the computer-readable memory produce an article of manufacture comprising instruction means. The instruction means implement the function(s) specified in one or more procedures of the flowcharts and/or one or more blocks of the block diagrams.

These computer program instructions may also be loaded onto a computer or other programmable data processing equipment, causing a series of operation steps to be performed on the computer or other programmable equipment to produce a computer-implemented process, so that the instructions executed on the computer or other programmable equipment provide steps for implementing the function(s) specified in one or more procedures of the flowcharts and/or one or more blocks of the block diagrams.

While preferred embodiments of the present invention have been described, additional changes and modifications to these embodiments can be made by those skilled in the art once they are aware of basic inventive concepts. Therefore, it is intended that the appended claims be construed to cover the preferred embodiment as well as all changes and modifications which fall within the scope of the present invention.

Obviously, those skilled in the art can make various changes and modifications to the present invention without departing from the spirit and scope of the present invention. Thus, if these modifications and variations of the present invention fall within the scope of the claims of the present invention and equivalent technologies thereof, the present invention is also intended to comprise these modifications and variations.

What is claimed is:

1. A smart watch-based somatosensory game method, comprising:

when a terminal starts a somatosensory game application, sending wake-up information to a smart watch by the terminal, thereby waking up a watch application installed in the smart watch, which enables the smart watch to collect somatosensory data of a user;

when a somatosensory game in the somatosensory game application is started, obtaining the somatosensory data from the smart watch;

constructing a virtual controller at the terminal, and importing the somatosensory data into the virtual controller to generate motion trajectory data of the user; and transmitting and sending the motion trajectory data to the somatosensory game application to generate a game operation instruction;

wherein constructing the virtual controller at the terminal, and importing the somatosensory data into the virtual controller comprise:

generating a grid map comprising a plurality of grid cells and a virtual rigid body at the terminal;

initializing a position of the virtual rigid body in the grid map;

updating the position of the virtual rigid body in the grid map according to the somatosensory data; and recording coordinate data of grid cells in the grid map that the virtual rigid body passes through during movement as the motion trajectory data.

2. The smart watch-based somatosensory game method according to claim 1, wherein updating the position of the virtual rigid body in the grid map according to the somatosensory data comprises:

calculating a displacement vector of the smart watch at each sampling time interval according to the somatosensory data;

determining a displacement direction and a displacement distance of the virtual rigid body in the grid map according to the displacement vector;

comparing the displacement distance with a length of one of the grid cells in the displacement direction; and in response to the displacement distance being greater than the length in the displacement direction, updating the position of the virtual rigid body in the grid map according to the displacement vector.

3. The smart watch-based somatosensory game method according to claim 2, wherein updating the position of the virtual rigid body in the grid map according to the displacement vector comprises: performing collision detection according to a shape and a size of the virtual rigid body and the displacement vector; and in response to the position of the virtual rigid body exceeding any boundary of the grid map according to a result of the collision detection, moving the virtual rigid body to a grid cell closest to the boundary in the grid map according to the displacement vector.

4. The smart watch-based somatosensory game method according to claim 1, wherein generating the grid map comprises:

determining a size and a number of grid cells in the grid map according to an attribute of the somatosensory game, wherein the attribute of the somatosensory game comprises a game type, game difficulty, and a game scene.

5. The smart watch-based somatosensory game method according to claim 4, wherein transmitting and sending the motion trajectory data to the somatosensory game application comprise:

in response to determining, according to the motion trajectory data, that the user has completed a required somatosensory action, generating a matching game instruction.

6. The smart watch-based somatosensory game method according to claim 5, wherein determining, according to the motion trajectory data, that the user has completed the required somatosensory action, comprises:

obtaining a motion trajectory function by fitting according to the motion trajectory data;

calculating a similarity between the motion trajectory function and a preset action function; and wherein the similarity being greater than a set threshold indicates that the user has completed the required somatosensory action.

7. A smart watch-based somatosensory game apparatus, comprising:

a wake-up module configured to, when a terminal starts a somatosensory game application, send wake-up information by the terminal to a smart watch, thereby waking up a watch application installed in the smart watch, which enables the smart watch to collect somatosensory data of a user;

an acquisition module configured to, when a somatosensory game in the somatosensory game application is started, obtain the somatosensory data from the smart watch;

a construction module configured to construct a virtual controller at the terminal and import the somatosensory data into the virtual controller to generate motion trajectory data of the user by generating a grid map comprising a plurality of grid cells and a virtual rigid body at the terminal, initializing a position of the virtual rigid body in the grid map, updating the position of the virtual rigid body in the grid map according to the somatosensory data, and recording coordinate data of grid cells in the grid map that the virtual rigid body passes through during movement as the motion trajectory data; and an instruction generating module configured to transmit and send the motion trajectory data to the somatosensory game application to generate a game operation instruction.

8. A smart watch-based somatosensory game device, comprising a memory, a processor and a smart watch-based somatosensory game program stored on the memory and executable on the processor, wherein when the processor executes the smart watch-based somatosensory game program, the smart watch-based somatosensory game method according to claim 1 is implemented.

9. A non-transitory computer-readable storage medium, having a smart watch-based somatosensory game program stored thereon, wherein when the smart watch-based somatosensory game program is executed by a processor, the smart watch-based somatosensory game method according to claim 1 is implemented.

* * * * *